Patented Aug. 9, 1949

2,478,418

UNITED STATES PATENT OFFICE 2,478,418

COLORED SMOKE COMPOSITION

John W. Orelup, Short Hills, N. J.

No Drawing. Application July 14, 1943,
Serial No. 494,693

4 Claims. (Cl. 52—24)

The present invention relates to improvements in the production of colored smokes used for the purpose of signals, military pyrotechnics and daylight fireworks.

Previous compositions for the production of colored smokes comprise mixtures of inorganic pigments or organic dyestuffs with compositions evolving heat. After ignition of the mixture the vapors of the heated dyestuff are forced through small orifices in the canister in which the compound is packed. These vapors are then condensed by contact with the air, producing a smoke. Various pigments and dyestuffs have been produced for this use, depending upon the color required. Satisfactory compounds for producing certain colors have been found but attempts to produce blue and green smokes have been unsatisfactory.

The object of the present invention is to provide a compound for producing blue smokes and which with the addition of other ingredients may be used to produce smokes which may be derived from a blue color, such for instance as green.

In order to secure appropriate conditions for the formation of stable smokes the chemical nature of the dyestuff and its physical properties must be considered, particularly its capability of forming air floated nuclei. Furthermore, for military purposes the color must be clear and distinct, not changing in hue during the burning. Where different colors are used to signal a maneuver no possibility of mistake of shade can be tolerated.

It has been attempted to produce blue smokes by using indigo as the coloring agent, and to produce greens by using mixtures of indigo and auramine yellow. These compounds have been unsatisfactory, however, because mixtures using indigo as a base furnish only dull smokes, changing color during burning from blue to a reddish purple. Satisfactory greens have not been obtainable.

I have found that alkylated amino anthraquinones may be incorporated in smoke producing compounds and caused to furnish colored smokes of great stability and of true and permanent shades of blue. The mixtures are slow burning so that prolonged formation of smoke is secured and the smoke is also of such character as to endure in visible form for a considerable time. There is no change in the color of the smoke from the beginning to the end of combustion. Such alkylated amino anthraquinones may also be combined with other coloring materials, suitable to produce different shades or colors, such for instance as with suitable yellows to produce greens of true shade and long duration. Certain of the alkylated amino anthraquinones are preferred because of their low melting point, high vapor tension, and indestructibility.

Suitable for the production of blue smokes are:

Di(1,4) methyl amino anthraquinone
Di(1,4) ethyl amino anthraquinone
Di(1,4) isopropyl amino anthraquinone
Di(1,4) n-propyl amino anthraquinone
Di(1,4) butyl amino anthraquinone
Di(1,4) isobutyl amino anthraquinone
Di(1,4) amyl amino anthraquinone The compound which I now prefer and which I have found to yield the clearest blue smoke of the longest duration is the di(1,4) amyl amino anthraquinone.

Example I

A typical example of a preparation for giving a clear blue smoke of long duration, visible for great distances, is as follows:

| | Parts |
|---|---|
| Di(1,4) amyl amino anthraquinone | 5 |
| Potassium chlorate | 2½ |
| Lactose | 2½ |

This mixture may be packed in any suitable form for ignition, preferably under high compression, such for instance as 1500 pounds to the square inch, in a metal cylinder having an open central canal and provided with a fuse or percussion cap by which the charge may be ignited.

For producing a green smoke an appropriate yellow coloring matter may be added, such for instance as auramine yellow. I prefer, however, to use quinoline yellow base (quinophthalone and chlorine derivatives thereof), as this produces much superior results to the auramine yellow.

Example II

| | Parts |
|---|---|
| Di(1,4) amyl amino anthraquinone | 2½ |
| Quinoline yellow base | 2½ |
| Potassium chlorate | 2½ |
| Lactose | 2 |
| Infusorial earth | ½ |

This signal on ignition gives a clear green.

The use of the quinoline yellow is not specifically claimed in this application, as the use of quinoline yellow in a smoke producing compound forms the subject matter of an application for patent Serial No. 494,694 filed by me July 14, 1943.

The alkyl amino anthraquinones, and particularly the di(1,4) amyl amino anthraquinone, form superior smoke producing compounds to compounds using indigo or other blue coloring matters such as aryl amino anthraquinones. The colors produced are clearer and more permanent, and the burning time is much longer, so that a signal of greater duration is produced. The residues on burning are less liable to coke and tar, thereby allowing the heated gases to spurt freely from the perforations in the canister, which results in a longer and more steady production of the colored smoke. I have found, for example, that the burning time for the same volume of material using the di-(1,4) amyl amino anthraquinone is nearly doubled, as compared with mixtures using indigo dye and is substantially longer than in the case of mixtures using aryl amino anthraquinone.

It is to be understood that in lieu of specific substances mentioned in the examples, chemical equivalents thereof may be used within the scope of the invention.

What is claimed is:

1. A composition for the production of colored smokes for signals and the like, and containing in solid admixture a combustible agent and an oxidizing agent which, upon ignition, furnish heat and gases for volatilizing and dispersing the color component, said composition containing in substantial proportion and as the active blue color component an alkylated amino anthraquinone.

2. A composition for the production of colored smokes for signals and the like, and containing in solid admixture a combustible agent and an oxidizing agent which, upon ignition, furnish heat and gases for volatilizing and dispersing the color component, said composition containing in substantial proportion and as the active blue color component a di-alkyl amino 1,4 anthraquinone.

3. A composition for the production of colored smokes for signals and the like, and containing in solid admixture a combustible agent and an oxidizing agent which, upon ignition, furnish heat and gases for volatilizing and dispersing the color component, said composition containing in substantial proportion and as the active blue color component a di(1,4) amyl amino anthraquinone.

4. A composition according to claim 1 in which the combustible and oxidizing agents are respectively lactose and an alkali metal chlorate.

JOHN W. ORELUP,

REFERENCES CITED

The following references are of record in the file of this patent:

UNITED STATES PATENTS

| Number | Name | Date |
|---|---|---|
| 1,319,329 | Gowdy | Oct. 21, 1919 |
| 1,969,249 | Alleman | Aug. 7, 1934 |
| 2,265,189 | Orelup | Dec. 9, 1941 |

FOREIGN PATENTS

| Number | Country | Date |
|---|---|---|
| 128,986 | Great Britain | July 10, 1919 |
| 361,362 | Great Britain | Nov. 6, 1931 |